United States Patent [19]

Peytavin

[11] Patent Number: 5,038,595

[45] Date of Patent: Aug. 13, 1991

[54] EXTRACTOR DEVICE FOR EXTRUSION PRESS

[75] Inventor: Pierre G. Peytavin, Neuilly-sur-Seine, France

[73] Assignee: Valinox, Boulogne-Billancourt, France

[21] Appl. No.: 503,927

[22] Filed: Apr. 4, 1990

[30] Foreign Application Priority Data

Apr. 5, 1989 [FR] France ............................ 89 05159

[51] Int. Cl.$^5$ .......................................... B21C 35/02
[52] U.S. Cl. ................................... 72/257; 72/301; 72/305; 72/426
[58] Field of Search ............... 72/291, 301, 305, 255, 72/257, 426

[56] References Cited

U.S. PATENT DOCUMENTS

| | | |
|---|---|---|
| 1,776,103 | 9/1930 | Burt . |
| 3,073,442 | 1/1963 | Muller et al. ...................... 72/255 |
| 3,587,280 | 6/1971 | Engelhardt et al. ................ 72/257 |
| 3,881,339 | 5/1975 | Mannell ............................. 72/257 |
| 4,307,597 | 12/1981 | Elhaus et al. ...................... 72/257 |
| 4,334,421 | 6/1982 | Ostlinning et al. ................. 72/257 |

FOREIGN PATENT DOCUMENTS

| | | |
|---|---|---|
| 508165 | 9/1930 | Fed. Rep. of Germany . |
| 1452374 | 2/1969 | Fed. Rep. of Germany . |
| 2045279 | 3/1972 | Fed. Rep. of Germany . |
| 1216807 | 4/1960 | France . |

Primary Examiner—Robert L. Spruill
Attorney, Agent, or Firm—Oblon, Spivak, McClelland, Maier & Neustadt

[57] ABSTRACT

An extraction device for a metal tube obtained by hot extrusion is located along an extrusion axis downstream of the die of an extrusion press. The extraction device has a group of elastic metal fingers for gripping the tube against a bearing surface of a discharge chute receiving the extruded tube. The fingers are joined at one end to a rotatable shaft in order to bring the fingers into elastic contact with an outer wall of the tube. A double-acting jack is connected directly or indirectly to the shaft in such a way as to permit the displacement of the tube clamped by the fingers towards the downstream end and to thereby extract its upstream end from the die.

12 Claims, 3 Drawing Sheets

EXTRACTOR DEVICE FOR EXTRUSION PRESS

BACKGROUND OF THE INVENTION

1. Field of the Invention

The extractor device according to the invention relates to the presses used for the hot extrusion of metal tubes through a die. It more particularly relates to the extrusion of steels of all types or other metals or alloys at a temperature generally above 900° C. with the use of glass as the lubricant.

2. Background of the Related Art

At the end of tube extrusion, when the thrust of the press tool is stopped, upstream of the die there is generally an untransformed metal portion. This portion can be of varying size representing several percent of the weight of the starting billet and can have variable shapes. This unextruded metal portion can e.g. be in the form of a mass remaining blocked at the end of extrusion in the front part of the container, or can be in the form of a more or less regular tube end.

It is therefore generally necessary to cut the tube off as close as possible upstream of the die in order to be able to extract it from the die from the downstream end. The tube is cut off following an adequate moving back of the container and the extrusion needle, whose downstream end is engaged in the tube downstream of the die and this moving back operation generally causes a slight moving back in the upstream direction through the die of the extruded tube. Once cutting off has taken place, the tube is extracted downstream through the die generally by forcing back the upstream end of the tube by the metal residue jammed in the container and which is again advanced.

This operation of extracting the tube from the die by forcing the upstream towards the downstream end suffers from the major disadvantage of making unusable for the preparation of the following extrusion cycle, both the container and the needle and leads to an overall and very large reduction in the extrusion rates.

Attempts have been made to obviate this operation of forcing the tube from the upstream to the downstream end by developing, according to the invention, an extractor device mounted downstream of the die and which permits, on the basis of a tube having an end blocked upstream of the die, but which is freed from the untransformed metal portion, to extract said tube through the die without causing local or general deformations or local or general defects on the hot tube, e.g. in the form of incrustations or dimensional changes as a result of the elongation resulting from the application to the tube of the tensile stresses necessary for the extraction.

The end blocked upstream of the die, but which is freed from the untransformed metal portion can be a cutoff end, as explained hereinbefore and in which the section may or may not have a rough edge, or can be a more or less regular end resulting from an almost complete extrusion, but which has remained in the die or upstream thereof, the case of almost complete extrusion being relatively rare.

Investigations have also taken place into the possibility of eliminating whenever the tube metal quantity still engaged in the die after extrusion is relatively small, the operation of cutting off the tube in the upstream area of the die. Attempts have also been made to obtain such a result without damaging the tube walls by clamping using a clamp or any other tool. The possibility of avoiding any significant extension of the operating cycle, which could be caused by carrying out a supplementary operation has also been investigated.

SUMMARY OF THE INVENTION

The device according to the invention makes it possible to solve the problem in a particularly effective manner. It makes it possible to free the tube obtained by extrusion from the die whenever a relatively limited material quantity remains retained within or upstream thereof. It also makes it possible to bring about this freeing action in a very short time. In most cases, it can also make it possible to combine this extraction with a following stage of the transverse disengagement of the tube obtained, following which the press equipment, downstream of the container, is again available and without any supplementary delay for starting up the following extrusion cycle.

In the most general terms, the extractor device for a metal tube obtained by hot extrusion through the die of a press according to the present invention, makes it possible to extract the upstream end of said hot tube from the die without damaging the tube. Located in the outlet line of the tube downstream of the die, it has a gripping means for the tube comprising a group of elastic metal fingers, which cooperate with a bearing surface. One of the two ends of each of these fingers is integral with a driving and clamping means, which makes it possible to simultaneously displace these fingers in such a way as to contact them, in a zone removed from the integral end of the driving and clamping means, with the outer wall of the tube and exert a clamping force on the tube, so as to apply it to a bearing surface. This clamping only leads to an elastic deformation of the fingers and the force exerted on the tube wall does not lead to an unacceptable permanent deformation. The tube length on which the fingers act can be distributed over one or more zones. Finally, the device comprises a tensile means directly or indirectly connected to the gripping means and making it possible to displace the latter and therefore the fingers parallel to the extrusion axis, in the downstream direction, with a tensile force at least equal to that necessary for extracting the rear end of said tube from the die. The number of fingers and the pressure exerted by each is such that no relative sliding of the tube with respect to the fingers and the bearing surface can occur during the extraction of the upstream end of the hot tube from the die and the tube is not locally deteriorated by the application of the fingers or subject to a general stress leading to permanent deformations during the extraction of the rear end from the die. The tubes to which the device apply can have a circular or non-circular cross-section.

Advantageously, the group of fingers consists of a minimum of 10 fingers and acts over a total tube length of at least 50 cm.

In a particularly advantageous manner, the finger driving and clamping means incorporates at least one shaft, which is substantially parallel to the extrusion axis and with which each finger is joined by one of its ends and at least one motor means rotating said shaft by exerting thereon a predetermined torque regulatable in such a way that the fingers bear elastically against the wall of the tube, whilst exerting the desired pressure thereon. Preferably, the bearing surface is located below the tube and the group of fingers comes into contact with the tube above the same, so as to engage the tube with the bearing surface.

Preferably, the bearing surface is integral with a chute, which guides the tube at the time of extrusion. Preferably, the bearing surface on the one hand and the group of fingers on the other are interconnected so as not to be able to move in relative manner with respect to one another along the extrusion axis, the tensile means thus being connected both to the group of fingers and to the bearing surface.

Preferably, the bearing surface is supported by a support means, such as a cradle, which moves parallel to the extraction axis by guide means, such as rollers running on rails. In the case where the bearing surface is integral with a chute, the group is advantageously mounted on a cradle provided with guiding means for its displacement parallel to the extrusion axis under the action of the tensile means. In a particularly advantageous manner, the chute is articulated with respect to the cradle along an axis parallel to the extrusion axis, a pivoting means making it possible to rotate the chute about said axis, following the extraction of the tube from the die and releasing the fingers, so that the chute is released and makes it possible for the following extrusion cycle to be carried out.

Return means advantageously make it possible to bring the gripping means back to their initial position at the end of the operating cycle. When these gripping means incorporate a bearing surface integral with a chute, the return means are so positioned as to bring the group back to the initial position at the end of the operating cycle.

By means of its fingers, the gripping means can consequently distribute the clamping force over the entire hot tube length corresponding to a group of fingers, each finger reacting independently, despite the common driving and clamping means, so as to adapt to the local geometry of the tube. Therefore the device is able to apply just that force necessary for the extraction of the hot tube avoiding any local overstressing thereof, which could lead to skin incrustations or deformations, which would make the tube unusable.

BRIEF DESCRIPTION OF THE DRAWINGS

The invention is described in greater detail hereinafter relative to a non-limitative embodiment and the attached drawings, wherein show.

DESCRIPTION OF THE PREFERRED EMBODIMENTS

Figure 1:
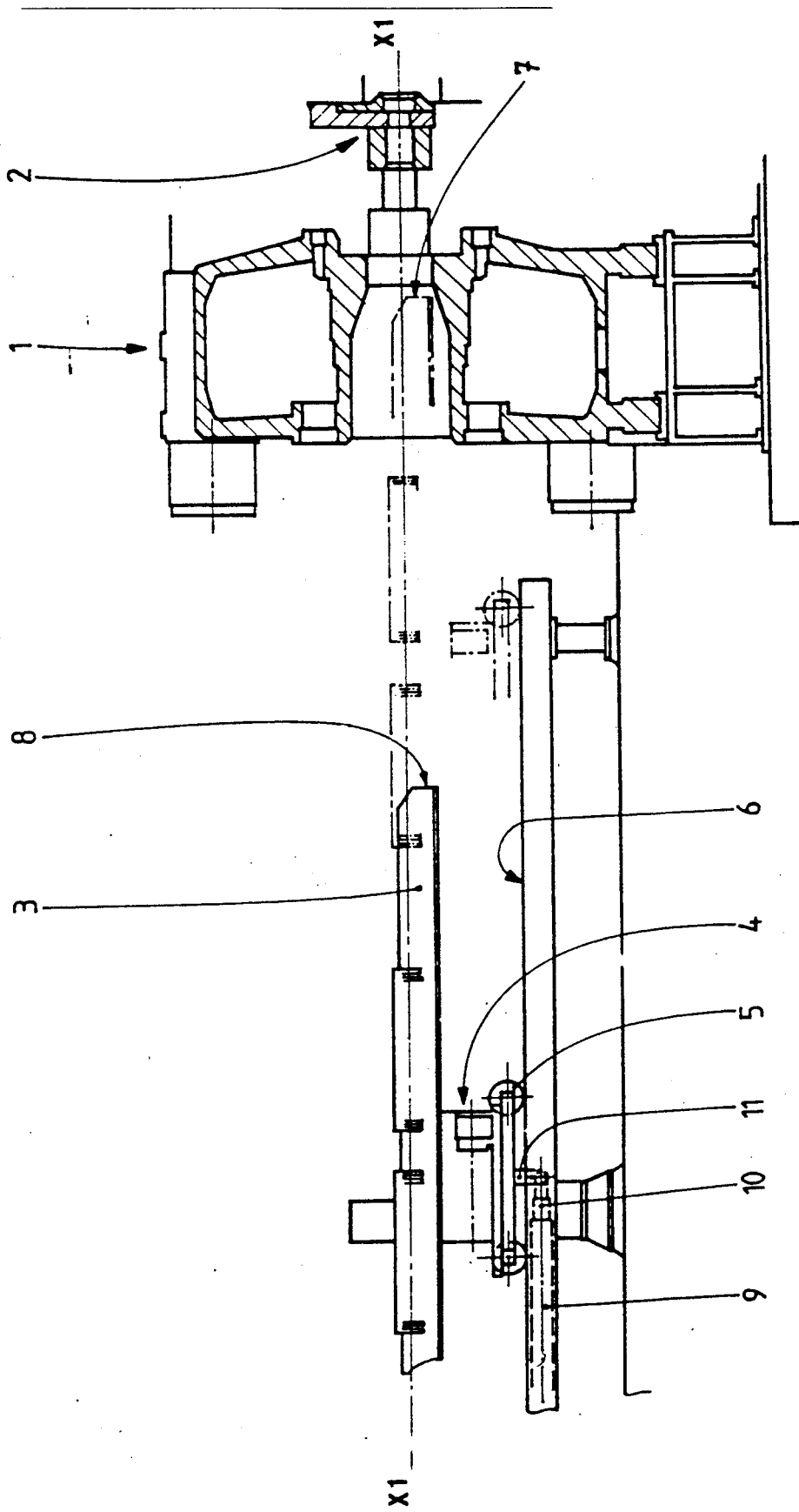
FIG. 1 an overall view, in elevation, of a device according to the invention.

FIG. 1 is a diagrammatic view in elevation of an embodiment of the extracting device according to the invention. On the right-hand side of the drawing, it is possible to see end 1 of an extrusion press provided with a die 2, in whose extension is located a chute 3 mounted on cradles, but only the cradle 4 is shown. These cradles are provided with rollers such as 5 able to travel on rails such as 6. During the extrusion of steel tubes, the metal of the billet raised to a temperature which is usually above 900° C. and located in the not shown container of the press, passes through the die 2 under the thrust of the not shown piston and engages in the form of a tube in chute 3, which guides it in the extension of the die axis X1—X1. Advantageously the assembly formed by cradles 4 and chute 3 is provided with a device permitting a height regulation of the chute position, in such a way that the axis of die 2 is slightly above the axis of the tube placed in the chute, so as to prevent the tube abutting against the chute inlet or that the latter is too low and makes the tube drop into the same from the die, said dropping movement possibly leading to a deformation of the tube. This device for regulating the height of the chute 3 is not shown here. In its initial position and as shown in FIG. 1, the upstream end of chute 3 is at 7 in the vicinity of the outlet orifice of the tube which has traversed die 2. A tensile means makes it possible to move said chute in such a way that its upstream end is moved from position 7 to position 8. This tensile means is shown purely diagrammatically in FIG. 1. It comprises a jack 9 located between the rails 6, whose piston 10 is connected to an arm 11 integral with cradle 4. The travel of said jack is adequate to free the chute 3 from the vicinity of the die and its force is adequate to permit the extraction of the rear end thereof from the die without any deformation of the tubes and without the latter sliding with respect to the gripping means.

Figure 2:
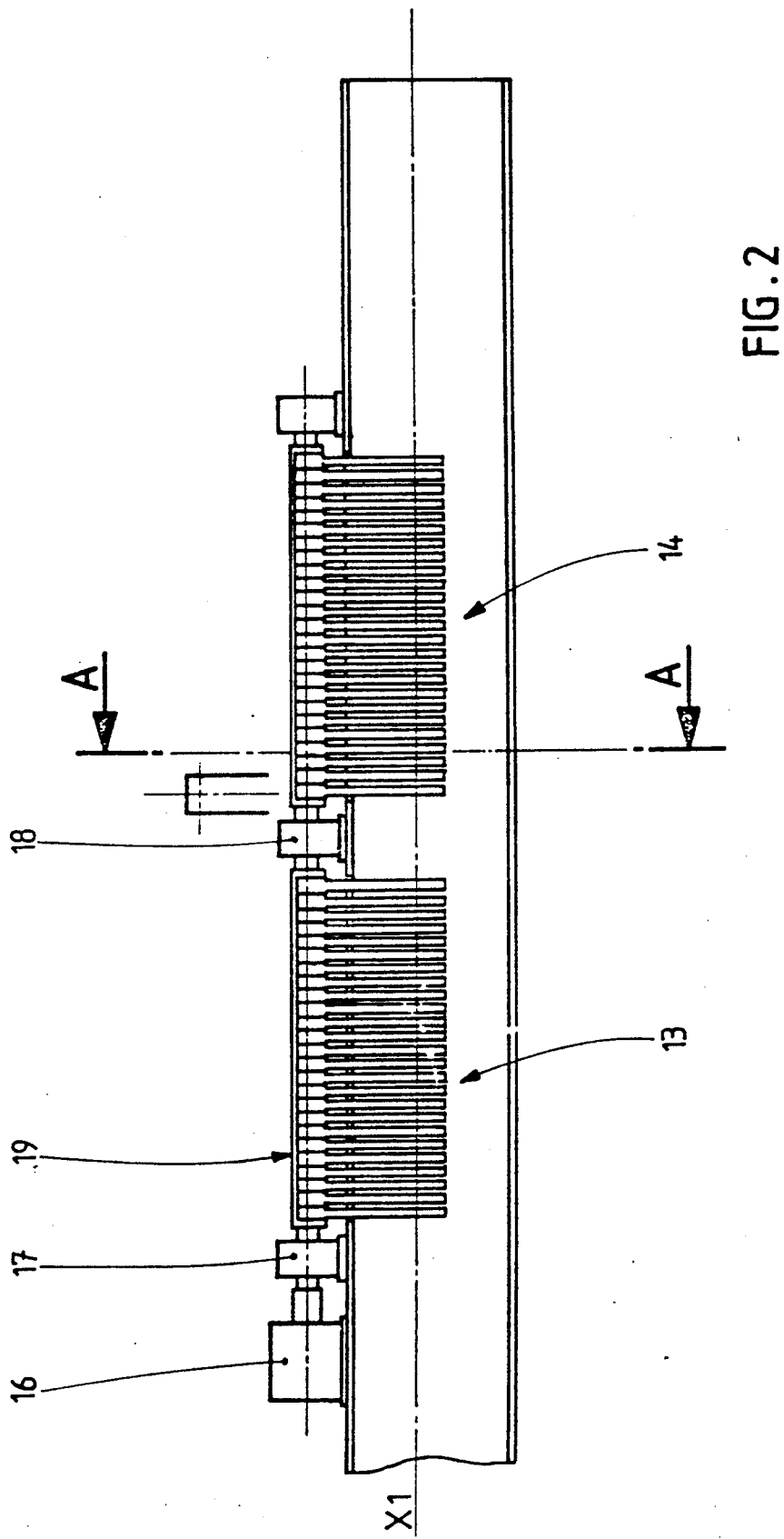
FIG. 2 a plan view of the device of FIG. 1.
Figure 3:
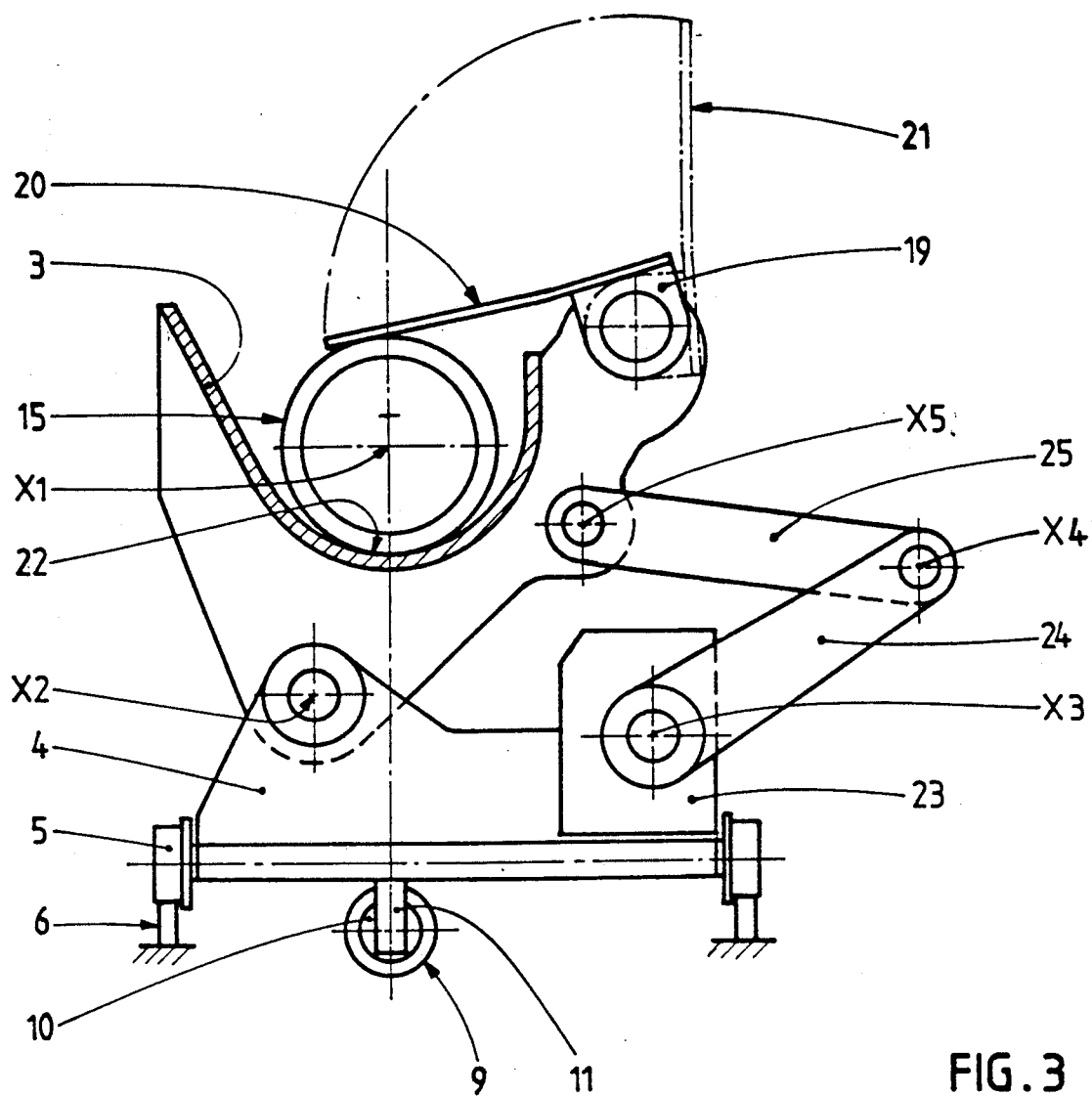
FIG. 3 a sectional view along plane A—A of FIG. 2.
Figure 4:
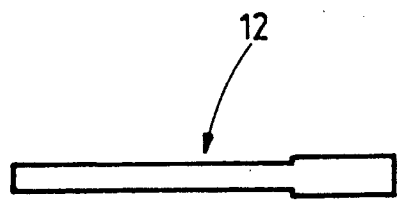
FIG. 4 a plan view of a finger used as an essential component of the gripping means according to the invention.

A gripping means is located close to the upstream end of the chute. As is more clearly visible in FIGS. 2 to 4, said gripping means comprises on the one hand a group of metal fingers such as the finger 12 shown in FIG. 4. It is a flat elongated plate, whereof one widened end is joined by an appropriate means, such as a screw connection, weld or brazed joint to a shaft. As is shown in FIG. 2 the group of fingers 20 comprises two sets of 25 fingers 13 and 14 positioned side by side, the axis of each finger being substantially perpendicular to the extrusion axis X1—X1, which itself essentially coincides with the axis of the tube located in chute 3 (cf. FIG. 3). A motor means such as a rotary jack 16 of a per se known type, makes it possible to rotate on its bearings 17,18 shaft 19, in such a way that the fingers such as 20 bear against the wall of tube 15 as shown in FIG. 3, or release the tube and come into an e.g. vertical position, as indicated by the broken lines at 21 therein. The jack 16 and bearings 17,18 of shaft 19 are joined to the chute, as shown in FIG. 2. Not shown abutment means prevent any displacement in the direction parallel to the extrusion axis of the shaft relative to the chute. The torque exerted by jack 16 on shaft 19 is adjustable by known means, in such a way that the clamping force exerted on the tube wall by each of the fingers such as 20 and which applies the tube to the bearing surface 22, joined to or constituted by the chute 3, only leads to an elastic deformation of fingers 20 and causes no unacceptable permanent deformation of tube 15. Routine tests make it possible to determine the tensile force necessary to exert on tube 15 to tear its end away from die 2 and the maximum permitted pressure per length unit on the wall of tube 15. From this can be deduced, whilst taking account of the average friction coefficient of tube 15 on bearing surface 22 and on the fingers, the extent of the span to be obtained along the tube by the group of fingers and by the corresponding bearing surface. From this can also be deduced the torque which should be applied to shaft 19 by means of the rotary jack 16.

Experience has shown that it is necessary to use numerous elastic fingers, so as to take account of the irregularities and true shape of the tube as extruded and that a one-piece jaw, even if of the same length, is not able to distribute the stresses over the length thereof and consequently causes a local deformation of the hot tube. These irregularities can e.g. be constituted by local overthicknesses of the lubricating glass during solidification or by metal particles displaced by the tubes. Due to the elasticity of each finger, each of them can move to a greater or less extent away from the mean position of the group of fingers, whilst continuing to exert on the wall a clamping force only differing slightly from the mean clamping force at each finger.

For example, in the case of a diameter 35 mm tube with a thickness of 3.5 mm, for a standard carbon steel, it is possible to exert a compressive force by means of the fingers on the wall of the tube, along a generatrix of approximately 1 to 4 kg/linear mm for a tube temperature of approximately 1100° C. Thus, the use of 50 fingers, each having a width of e.g. 30 mm makes it possible to exert on the tube a clamping force of approximately 1.5 to 6 tonnes and consequently, whilst taking account of a friction coefficient of the tube of approximately 0.2 on the fingers and the bearing surface 22, it is possible to exert a tensile stress on the tube by means of jack 9 via chute 3, which can reach 600 to 2400 kg. Tests have shown that such a tensile force exerted on the tube whilst still at a very high temperature permits the extraction of its rear end from the die in all cases where there is no large metal quantity upstream of the die. Such a result is also obtained without any unacceptable deformation of the tube. Tension takes place on the chute in the manner described hereinbefore by using jack 9, whose maximum fluid pressure is adjusted in order to limit the force to a value not exceeding a predetermined limit. After extracting the tube from the die, the rotary jack 16 makes it possible to raise the group of fingers such as 20 and as can be seen at 21 in FIG. 3. It is then possible to bring about the lateral tilting of chute 3 by making it turn about axis X2 by means of which it is articulated with respect to the cradle 4. A tilting jack 23 integral with the cradle 4 actuates the arms 24,25 articulated about axes X3, X4 and X5, which brings about the lateral tilting of chute 3 and the dropping of tube 15, which is then conveyed by not shown cold transformation and/or finishing means. It is then merely necessary to raise the chute by the same jack 23 and then move it into its initial position upstream, so that its upstream end is again located at 7 in the vicinity of the outlet of die 2. This upstream return is carried out by means of the double-action jack 9. Other means can be used for carrying out the tension of the chute along the extrusion axis and returning it to its initial position. Use can in particular be made of a rack and pinion means, which is also known to the Expert.

When a chute is used for receiving the tube obtained by extrusion, the latter must often have thermal insulation and/or cooling means, as well as expansion joints to prevent the deformation of the cradle. However, these techniques are well known to the Expert.

The characteristics of the fingers and in particular their thickness, the lever arm length between the contact point with the tube wall and the drive shaft axis and finally the metal or alloy used and its mechanical characteristics are determined as a function of the operating conditions on the basis of routine tests. Numerous modifications can be made to the device according to the invention without passing beyond the scope of the latter.

What is claimed is:

1. Extracting device for a metal tube obtained by hot extrusion through the die of a press making it possible to move an upstream end of the tube from the die without damaging the tube wherein, located in an outlet line of the tube downstream of the die, said extracting device comprises a means for gripping said tube having a group of elastic means comprising elongate fingers extending substantially transverse to the length of the tube and cooperating with a bearing surface to support the tube, one end of each of the fingers being joined to a driving and clamping means making it possible to simultaneously displace the fingers so as to bring the fingers into contact with an outer wall of the tube and exert thereon a clamping force, said fingers applying elastic pressure on the tube so as to press the tube onto said bearing surface; a stress exerted on the outer wall of the tube causing no unacceptable permanent deformation; a tensile means is connected in a direct or indirect manner to the gripping means, so as to displace the gripping means and therefore the group of fingers parallel to an extrusion axis in the downstream direction, and to displace the tube, as a result of the pressure exerted by the group of fingers on the outer wall of the tube, the thus applied tensile force making it possible to extract the upstream end of the tube from the die.

2. Device according to claim 1, wherein the finger driving and clamping means has at least one shaft substantially parallel to the extrusion axis to which each finger is joined by said one end; and at least one motor means for rotating said shaft by exerting thereon a torque established in such a way that the fingers bear against the tube wall by exerting thereon the desired pressure.

3. Device according to claims 1 or 2, wherein the fingers are arranged so as to bear on an upper part of the tube wall, the bearing surface being located below the tube.

4. Device according to claim 2 wherein the bearing surface is integral with a chute for guiding the tube at the time of extrusion.

5. Device according to claim 4, wherein the bearing surface is constituted by the chute.

6. Device according to claim 4, wherein the bearing surface and the group of fingers are interconnected so as not to be able to move relative to one another along the extrusion axis.

7. Device according to claim 4, wherein said shaft is mounted on bearings integral with the chute, and said device further comprises abutment means preventing a relative displacement of the shaft with respect to the chute in a direction parallel to the extrusion axis.

8. Device according to claim 4, wherein the bearing surface is mobile along an axis parallel to the extrusion axis as a result of guide means.

9. Device according to claim 8, wherein the group of fingers and the bearing surface are mounted on a cradle provided with guide means, said cradle being connected to the tensile means so as to permit the extraction of the upstream end of the tube from the die.

10. Device according to claim 9, wherein the chute is articulated with respect to the cradle about an articulation axis parallel to the extrusion axis, a tilting or pivoting means is provided for making it possible to rotate the chute about said articulation axis following the extraction of the tube from the die and the release of the fingers so as to bring about a dropping of the tube.

11. Device according to claim 1, wherein the tensile means is a double-action jack.

12. Device according to claim 1, wherein the group of fingers has at least 10 fingers acting over a total tube length of at least 50 cm.

* * * * *